Feb. 24, 1970                S. C. REES                3,496,972
        RECIPROCATING POWER SAWS WITH REVERSIBLE SHOE AND
                    SPECIAL BLADE CLAMP
Filed Nov. 2, 1967                                2 Sheets-Sheet 1
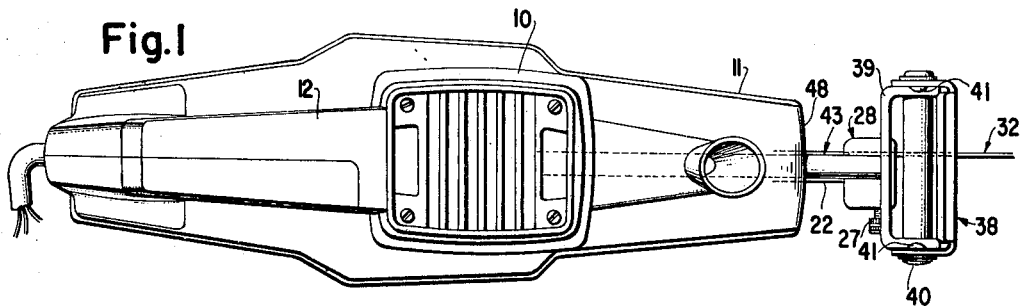
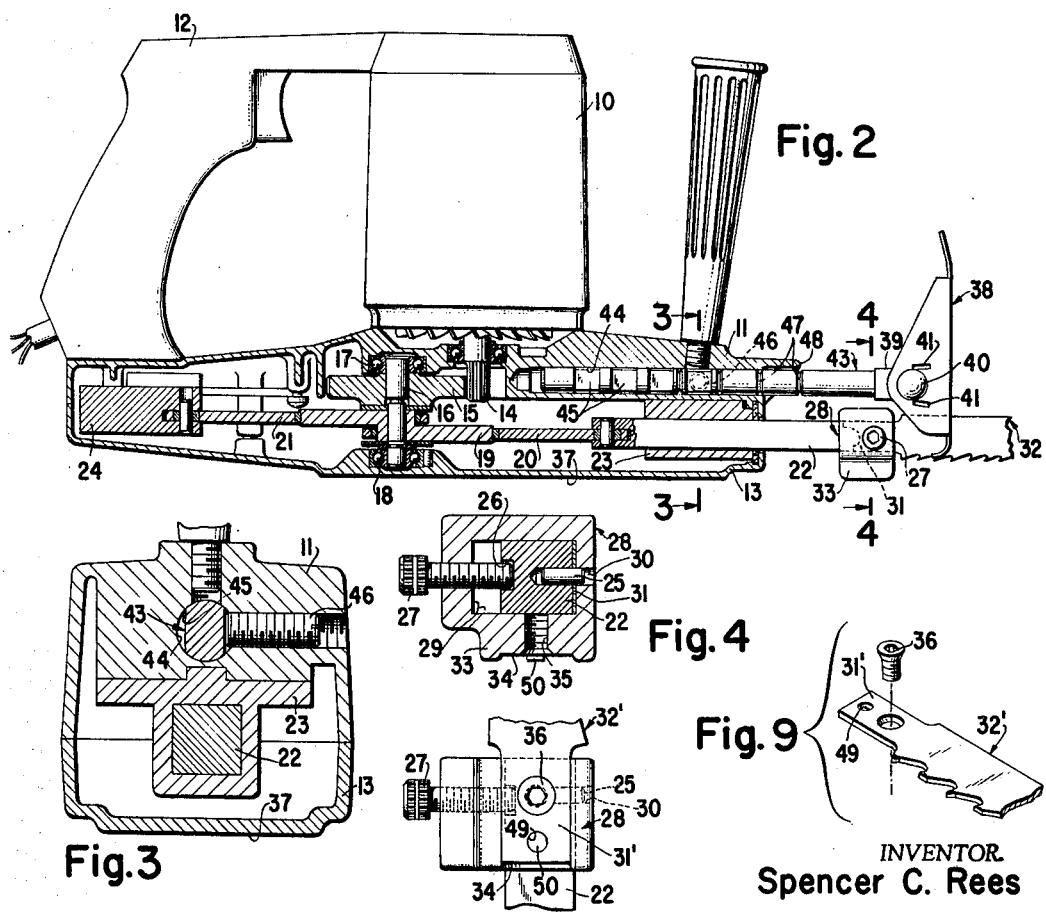
INVENTOR.
Spencer C. Rees
BY
ATTORNEY
WITNESS:

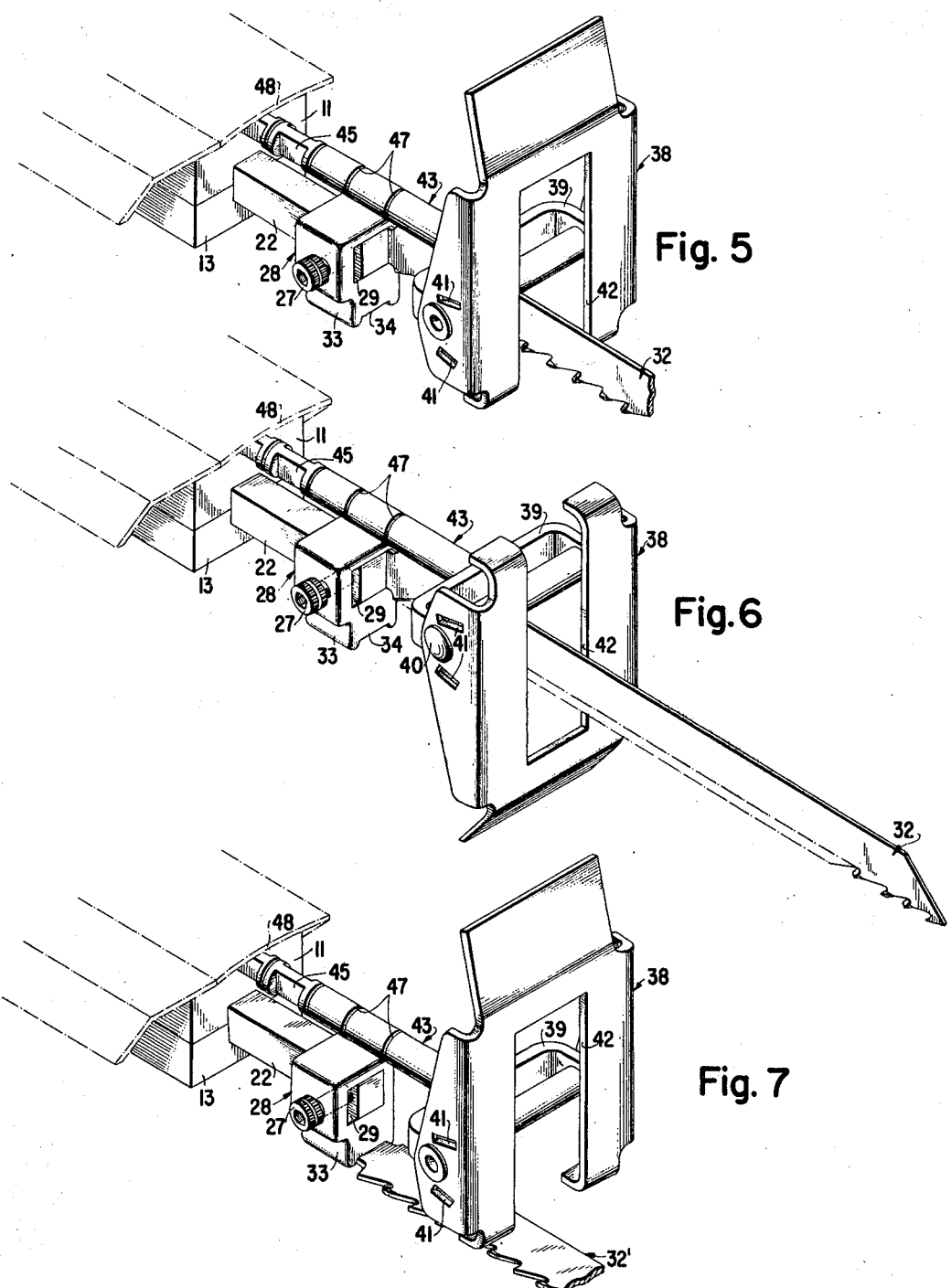

United States Patent Office 3,496,972
Patented Feb. 24, 1970

3,496,972
RECIPROCATING POWER SAWS WITH REVERSIBLE SHOE AND SPECIAL BLADE CLAMP
Spencer C. Rees, Pickens, S.C., assignor to The Singer Company, New York, N.Y., a corporation of New Jersey
Filed Nov. 2, 1967, Ser. No. 680,096
Int. Cl. B27b 11/08, 11/00
U.S. Cl. 143—68                                       3 Claims

ABSTRACT OF THE DISCLOSURE

A power saw having a reciprocating saw bar has a work-contacting shoe formed with a single blade clearance slot. The shoe is pivotally mounted on a yoke secured to a round bar slidably and rotatably received in the main housing and secured therein by a single set screw. Spaced flats formed on the bar are aligned with the set screw for predetermined multiple securement in extended and rotated positions of the shoe. A blade clamp has a rectangular aperture for receiving the square saw bar and the blade shank in flat clamped relation along a lateral surface of the saw bar for ordinary standard use. The blade clamp is formed with an external surface recess in which the saw blade may be secured to provide a blade position offset from the saw bar and lying substantially in the plane of the bottom surface of the saw housing for special flush cutting use.

BACKGROUND OF THE INVENTION

Prior art saws of this type are disclosed in the U.S. Patent No. 2,998,830 issued to G. E. Atkinson on Sept. 5, 1961, U.S. Patent No. 3,028,890 issued to G. E. Atkinson et al. on Apr. 10, 1962 and U.S. Patent No. 3,155,128 issued to J. H. Godfrey et al. on Nov. 3, 1964. As shown, the work-contacting shoes heretofore known are either secured permanently to the saw housing or are adjustably secured thereto for limited extension in the direction of blade length and for limited movement normally thereof. The prior art shoes are formed with two blade clearance slots which must be matched with specific blade positions for changing the direction of cutting and the shoe supporting structure is such as to prevent easy access to the blade clamping structure for blade removal.

Furthermore, the prior art blade clamping structure provides only for clamping the blade flat against the lateral surfaces of the saw bar which provides insufficient offset for good flush cutting.

SUMMARY OF THE INVENTION

This invention is directed to a portable power saw of the reciprocating type readily adaptable for multi-directional cutting and more particularly relates to an adjustable work-engaging shoe combined with a special blade clamping means which cooperate to adapt the saw for standard or flush cutting with a minimum of effort and time.

It is therefore a primary object of this invention to provide a work-contacting shoe and supporting structure which when combined with novel blade clamping means overcomes the disadvantages of the prior art structure discussed above.

Other objects will be in part obvious and in part pointed out more in detail hereinafter.

The invention accordingly consists in the features of construction, combination of elements and arrangement of parts which will be exemplified in the construction hereinafter set forth and the scope of the application of which will be indicated in the appended claims.

BRIEF DESCRIPTION OF THE DRAWINGS

In the drawings:
FIG. 1 is a top plan view of a power saw embodying the invention.
FIG. 2 is a side elevation view, partly in section, of the saw of FIG. 1.
FIG. 3 is a transverse section taken substantially on line 3—3 of FIG. 2.
FIG. 4 is a transverse section taken substantially on line 4—4 of FIG. 2.
FIG. 5 is a perspective view showing the relation of the work-contacting shoe and the saw blade for one type of cutting.
FIG. 6 is a perspective view showing the shoe in a position rotated 180 degrees from that shown in FIG. 5.
FIG. 7 is a perspective view showing the relation of the work contacting shoe and the saw blade in flush cutting position.
FIG. 8 is a fragmentary bottom plan view showing the blade clamping arrangement for flush cutting.
FIG. 9 is a detailed view showing a saw blade having a special shank for flush cutting.

DESCRIPTION OF A PREFERRED EMBODIMENT

Referring now to FIGS. 1 and 2, a reciprocating saw is shown having a motor housing 10, a lower housing 11, a handle 12 and a lower housing cover 13.

An electric motor (not shown) located with the housing 10 has a shaft 14 splined to mesh with a gear 15 secured for rotation with a stub shaft 16 journaled in ball bearings 17, 18. Also secured to the shaft 16 for rotation therewith is a double eccentric 19 to which are connected pitmans 20 and 21. Pitman 20 is pivotally connected to a saw bar 22 slidably secured in a bearing block 23 fixed to the lower housing 11 to guide the saw bar in linear reciprocatory motion as the eccentric 19 rotates.

Pitman 21 is pivotally connected to a counterweight 24 which is constrained by guides (not shown) to move in a linear path which is a linear extension of the path of motion of the saw bar 22. The eccentric cranks are 180 degrees apart in phase position so that the counterweight 24 serves to balance the vibratory forces incident to linear reciprocations of the saw bar 22.

The saw bar 22 is square in cross section and, as seen best in FIG. 4, is formed at its free end with a pin 25 projecting from one lateral surface thereof. The opposite lateral surface of the saw bar is formed with a depressed seat 26 for receiving the end of a set screw 27 threaded into a blade clamp 28.

The blade clamp 28 is of block-type form and has a through-aperture 29 of rectangular cross section for slidable engagement with the saw bar 22 and also has a side aperture 30 for receiving the pin 25. The shank portion 31 of a saw blade 32 is held in flat clamped relation between the blade clamp 28 and a lateral surface of the saw bar 22 with the pin 25 engaging a suitable aperture (not shown) in the blade shank 31. It is clear from FIG. 4 that one dimension of the rectangular aperture 29 is sufficiently larger than the side of the saw bar 22 to permit lateral movement of the blade clamp (with screw 27 withdrawn) to disengage the pin 25 from aperture 30 and permit the blade 32 to be removed.

The blade clamp 28 is provided on one side with a thickened portion 33 having an external surface depression 34 in which is received the shank 31 of the saw blade 32 for flush cutting as will be explained presently. A tapped hole 35 receives a screw 36 (as seen best in FIG. 8) which passes through the shank aperture to hold the blade shank 31 clamped securely in the depression 34. In this flush cutting position, the blade clamp 28 is of course securely locked to the saw bar 22 by means of the set screw 27 and by engagement of pin 25 with the aperture 30. The plane of the blade 32 is, due to the thickened portion 33, substantially coextensive with the plane of the lower surface 37 of the housing cover 13 as seen best in FIG. 7 so that the tool may be brought flush with the intersecting surface for flush cutting in a corner.

As seen in FIG. 8 and FIG. 9, the saw blade 32' may be furnished with a special shank portion 31' which contains a second aperture 49 for receiving a pin 50 secured to the blade clamp 28.

A work-contacting shoe 38 is pivotally mounted on a yoke 39 by means of a pin 40. Limited pivotal motion of the shoe 38 about the axis of pin 40 is obtained by stops 41—41 struck into the yoke as seen best in FIG. 5. The shoe 38 is formed with a single clearance slot 42 for the saw blade 32.

A round bar 43 is secured to the yoke 39 and is slidably and rotatably received in a deep cylindrical bore 44 formed in the housing 11. Spaced flats 45 on the bar 43 cooperate with a single set screw 46, as shown in FIG. 3, to provide multiple locking positions for the shoe 38 in different extended and rotated positions thereof.

To assist in gauging the proper extension position of the shoe 38, the bar 43 is provided with spaced scribed lines 47 and when one of these lines is brought into substantial alignment with the forward edge 48 of the housing 11, as seen in FIG. 2, a flat 45 will be in proper position for secure engagement with the set screw 46.

From an inspection of FIGS. 5, 6 and 7 and in view of the structure above described, it will be understood that the shoe 38 together with the bar 43 can readily be removed from the housing 11, reversed 180 degrees, and resecured in the housing without removing the saw blade 22 from its clamped position. It is also clear that the blade clamp 28 is always readily accessible for reversing the position of the blade in the clamp without interference with the supporting structure for the shoe 38 in any position.

Thus there are, in all, eight different combinations of blade position relative to the shoe position readily obtainable by the structure of this invention and this makes this saw adaptable for practically any sawing application likely to be encountered.

The simple mounting of the pivoting shoe 38 on the single retractable bar 43 offset from the saw bar 22 makes it unnecessary to employ any supporting structure therefor in the vicinity of the blade clamp 28 which otherwise would interfere with the adjustment of said clamp when changing blades.

Having thus described the nature of the invention, what I claim herein is:

1. In a portable power saw having a reciprocating saw bar, the combination of a work-contacting shoe having a single blade-clearance slot and adjustably rotatable about an axis substantially normal to the plane of the shoe, with a blade clamp surmounting the saw bar and providing a first adjustably secured position for the saw blade which is substantially an extension of the lateral surface of the saw bar and a second adjustably secured position for the saw blade which is substantially laterally offset from a lateral surface of the saw bar and is normal to said first position.

2. In a portable power saw having a housing, a reciprocating saw bar and a work-contacting shoe, the improvement which comprises in combination;
 (a) a single support bar for the shoe,
 (b) a deep bore formed in said housing for receiving said support bar in slidable and rotatable engagement therewith,
 (c) single screw means tapped into said housing for securing said support bar in said selected positions,
 (d) a blade-clamping block having a through-aperture for receiving the saw bar,
 (e) single screw means tapped into the block for clamping the saw bar to the block,
 (f) a recess formed in an external surface of said block, and
 (g) single screw means tapped into the block for clamping a saw blade in said recess in a position substantially laterally offset with relation to the saw bar.

3. In a portable power saw having a reciprocating saw bar of square cross-sectional shape, saw blade attaching means comprising; a pin secured to and projecting from one lateral surface of said saw bar, a block having a through aperture of rectangular cross-section for slidable engagement with the saw bar and a side aperture of circular cross section for slidable engagement with the pin, and set-screw means tapped into the block for securing the block in clamped engagement with the saw bar and with the pin in engagement with the side aperture, said block being formed with a thickened portion having a surface recess for receiving the saw blade in a position substantially offset with relation to the saw bar.

References Cited
UNITED STATES PATENTS

| | | | |
|---|---|---|---|
| 1,984,500 | 12/1934 | Tautz | 143—156 |
| 2,548,411 | 4/1951 | Vaché. | |
| 2,601,788 | 7/1952 | Parker. | |
| 3,028,890 | 4/1962 | Atkinson et al. | 143—156 |
| 3,260,290 | 7/1966 | Happe et al. | |

DONALD R. SCHRAN, Primary Examiner

U.S. Cl. X.R.

143—156